US011155147B2

(12) United States Patent
Jara Zambrano et al.

(10) Patent No.: US 11,155,147 B2
(45) Date of Patent: Oct. 26, 2021

(54) AUXILIARY POWER DEVICE

(71) Applicant: Ford Global Technologies, LLC, Dearborn, MI (US)

(72) Inventors: Jorge Jara Zambrano, Atizapan de Zaragoza (MX); Adrian Romero Regalado, Cuautitlan Izcalli (MX); Sergio Alberto Vega Velazquez, Nicolas Romero (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 341 days.

(21) Appl. No.: 16/317,881

(22) PCT Filed: Jul. 15, 2016

(86) PCT No.: PCT/US2016/042458
§ 371 (c)(1),
(2) Date: Jan. 15, 2019

(87) PCT Pub. No.: WO2018/013130
PCT Pub. Date: Jan. 18, 2018

(65) Prior Publication Data
US 2019/0241056 A1 Aug. 8, 2019

(51) Int. Cl.
*B60K 1/04* (2019.01)
*A61G 5/04* (2013.01)
(Continued)

(52) U.S. Cl.
CPC .............. *B60K 1/04* (2013.01); *A61G 5/047* (2013.01); *B62M 6/40* (2013.01); *B62M 6/90* (2013.01)

(58) Field of Classification Search
CPC .. B60K 1/04; B62M 6/90; B62M 6/40; A61G 5/047
See application file for complete search history.

(56) References Cited

U.S. PATENT DOCUMENTS 2,520,587 A   8/1950  Wiesert
3,690,440 A * 9/1972  Macpherson ........ B65G 13/065
                                                    198/782

(Continued)

FOREIGN PATENT DOCUMENTS

DE   102004039519 B3   6/2005
JP       H08266574 A   10/1996

(Continued)

OTHER PUBLICATIONS

European Supplemental Search Report dated Mar. 11, 2020; Appl. No. 169090210.

(Continued)

*Primary Examiner* — Minnah L Seoh
*Assistant Examiner* — Marlon A Arce
(74) *Attorney, Agent, or Firm* — Brandon Hicks; Bejin Bieneman PLC (57) ABSTRACT

An auxiliary power device includes a housing, a motor supported by the housing, and a wheel engaged with the motor. The wheel has a rotational axis and a spindle on the rotational axis. The housing defines a track adjustably supporting the spindle of the wheel. The adjustability of the spindle supported by the track in the housing allows for the wheel to adjust relative to the housing and allows the auxiliary power device to be used on a variety of vehicles.

20 Claims, 6 Drawing Sheets

(51) Int. Cl.
*B62M 6/40* (2010.01)
*B62M 6/90* (2010.01)

(56) References Cited

U.S. PATENT DOCUMENTS

| | | | |
|---|---|---|---|
| 3,767,000 | A | 10/1973 | Smith |
| 4,172,351 | A | 10/1979 | Scanland |
| 4,346,772 | A | 8/1982 | Clifft |
| 4,759,418 | A | 7/1988 | Goldenfeld et al. |
| 4,881,842 | A | 11/1989 | Farrell et al. |
| 5,113,959 | A | 5/1992 | Mastov et al. |
| 5,141,067 | A | 8/1992 | Diggs |
| 5,816,355 | A | 10/1998 | Battlogg et al. |
| 5,984,615 | A * | 11/1999 | Sundseth ............... B64C 1/20 198/782 |
| 6,481,514 | B2 | 11/2002 | Takada |
| 6,752,224 | B2 * | 6/2004 | Hopper ............... A61G 7/08 180/19.1 |
| 6,880,661 | B1 | 4/2005 | Oh |
| 8,662,217 | B2 * | 3/2014 | Block ............... B62B 5/005 180/16 |
| 8,684,113 | B1 | 4/2014 | Laconis |
| 9,144,525 | B2 | 9/2015 | Richter |
| 9,241,852 | B2 | 1/2016 | Dougherty et al. |
| 10,076,457 | B2 * | 9/2018 | Behm ............... A61G 5/1008 |
| 10,926,834 | B2 * | 2/2021 | Richter ............... A61G 5/048 |
| 2005/0189155 | A1 * | 9/2005 | Bender ............... B62D 59/04 180/15 |
| 2012/0080243 | A1 * | 4/2012 | Mulhern ............... A61G 5/047 180/11 |
| 2013/0008732 | A1 | 1/2013 | Richter |
| 2013/0118139 | A1 | 5/2013 | Hickenbottom |
| 2015/0351979 | A1 * | 12/2015 | Conte ............... B62B 3/0612 180/13 |

FOREIGN PATENT DOCUMENTS

| | | |
|---|---|---|
| JP | 2010207454 A | 9/2010 |
| WO | 2013052778 A1 | 4/2013 |

OTHER PUBLICATIONS

"ROMACHAIR" Roma Medical, https://romamedical.co.uk/shop/power-chairs/roma-power-pack/.

Weiss, "Compact Wheezy trailer snaps onto your bike and makes it electric", Oct. 16, 2015, http://www.gizmag.com/wheezy-electric-bike-trailer/39784/.

International Search Report and Written Opinion dated Oct. 6, 2016 re International Appl. No. PCT/US2016/042458.

* cited by examiner

AUXILIARY POWER DEVICE

BACKGROUND

Vehicles, such as bicycles, wheel chairs, and scooters, may be manually operated or powered. For example, the vehicles may be powered by motors. The motor is typically mounted to the frame of the vehicle and is configured to rotate the wheels of the vehicle as instructed by the operator. These motors are typically permanently mounted to the vehicle.

DETAILED DESCRIPTION

With reference to the Figures, wherein like numerals indicate like parts throughout the several views, an auxiliary power device 10 includes a housing 12, a motor 14 supported by the housing 12, and a wheel 16 engaged with the motor 14. The wheel 16 has a rotational axis R and a spindle 18 on the rotational axis R. The housing 12 defines a track 20 adjustably supporting the spindle 18 of the wheel 16.

The auxiliary power device 10 may be removeably attachable alternately to a plurality of different types of vehicles, as described further below, to motorize the vehicles. For example, as set forth further below, the vehicle may be a manually powered vehicle. The track 20 of the housing 12 allows for adjustment of the wheel 16 relative to the housing 12 for proper positioning of the wheel 16 dependent on different requirements of each of the different types of vehicles. In other words, no matter what height or angle the auxiliary power device 10 is coupled to one of the vehicles, the wheel 16 is able to contact the ground in a position to properly motorize movement of that vehicle.

Figure 1A:
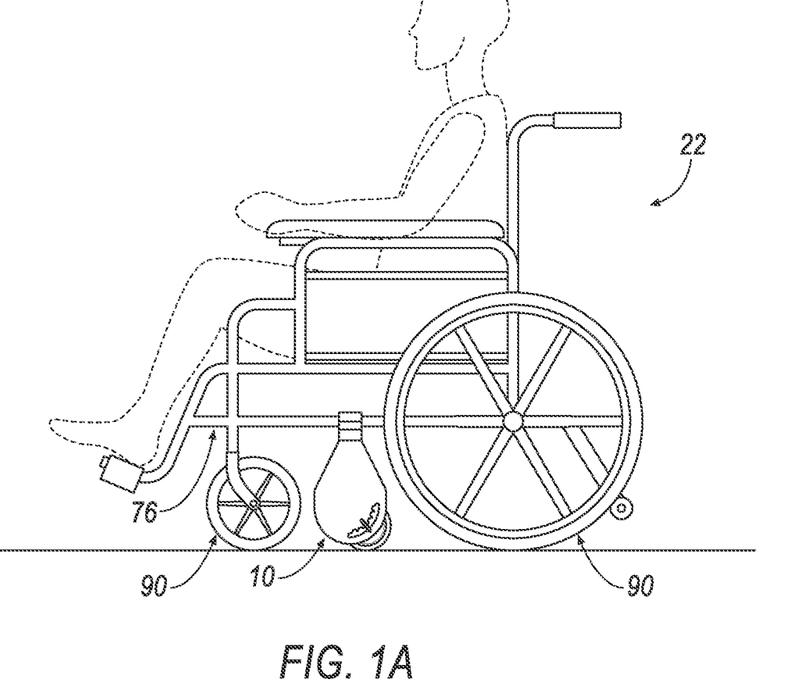
FIG. 1A is a perspective view of an auxiliary power device removably attached to a wheelchair.
Figure 1B:
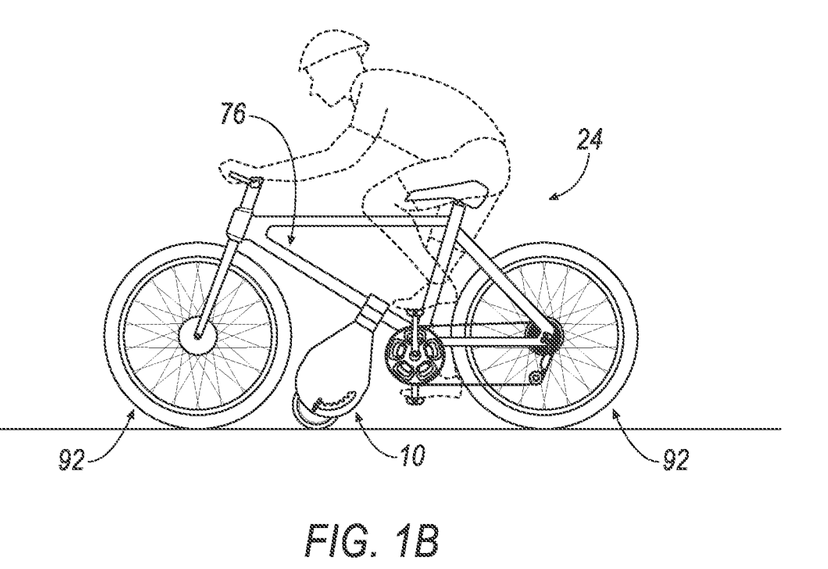
FIG. 1B is a perspective view of the auxiliary power device removably attached to a bicycle.

The vehicles may be of any suitable type. For example, one of the vehicles may be a wheel chair 22, as shown in FIG. 1A. As another example, one of the vehicles may be a bicycle 24, as shown in FIG. 1B. As other examples, the vehicles may include scooters, rollerblades, strollers, suitcases, etc. The auxiliary power device 10 may be removeably attachable to any number of vehicles of any type, i.e., two or more.

Each of the vehicles includes a frame 76, and the auxiliary power device 10 is removeably attachable to the frames 76 of each of the vehicles. Only a single auxiliary power device 10 is shown connected to the frame 76 in FIGS. 1A and 1B, however, a plurality of auxiliary power devices 10 may be removably attached to the same frame 76. The frames 76 of the different vehicles may have the same cross-sectional size and shape, or may have different cross-sectional sizes and shapes. In any event, as set forth further below, the auxiliary power device 10 may be removeably attachable to the different frames 76 of the different vehicles.

Each vehicle has at least one wheel rotatably coupled to the frames 76. For example, the wheel chair 22 of FIG. 1A has four wheels 90 and, as another example, the bicycle 24 of FIG. 1B has two wheels 92. Any one of vehicles may be manually powered or motorized without the auxiliary power device 10.

Figure 2:
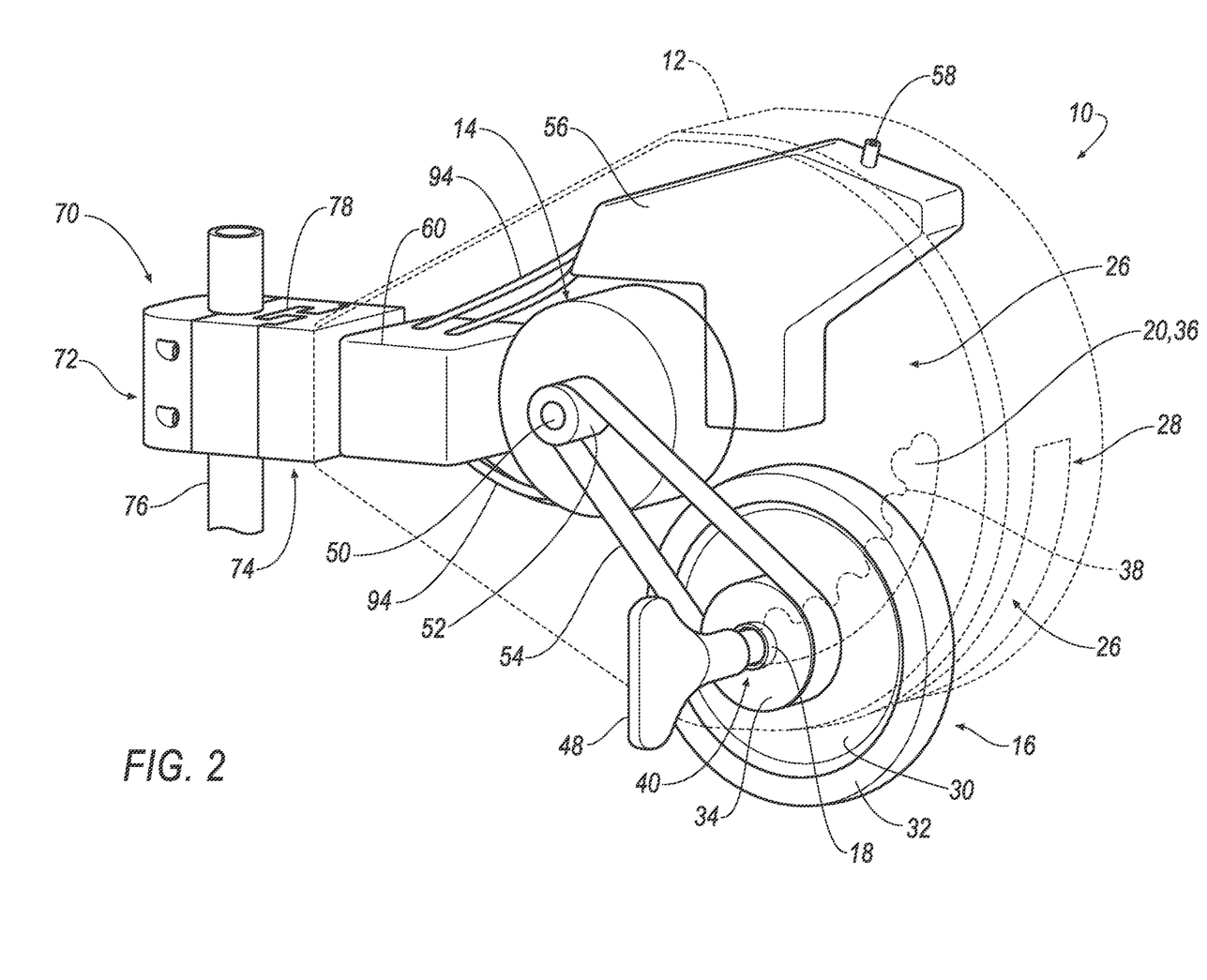
FIG. 2 is a perspective view of a housing of the auxiliary power device shown in broken lines.

With reference to FIG. 2, the housing 12 defines a cavity 26. The motor 14 is disposed in the cavity 26 along with other components, as set forth further below. The housing 12 may define an opening 28 in communication with the cavity 26. The wheel 16 may be partially disposed in the cavity 26 and extend through the opening 28 for contact with the ground, as shown in FIGS. 1A and 1B.

Figure 3:
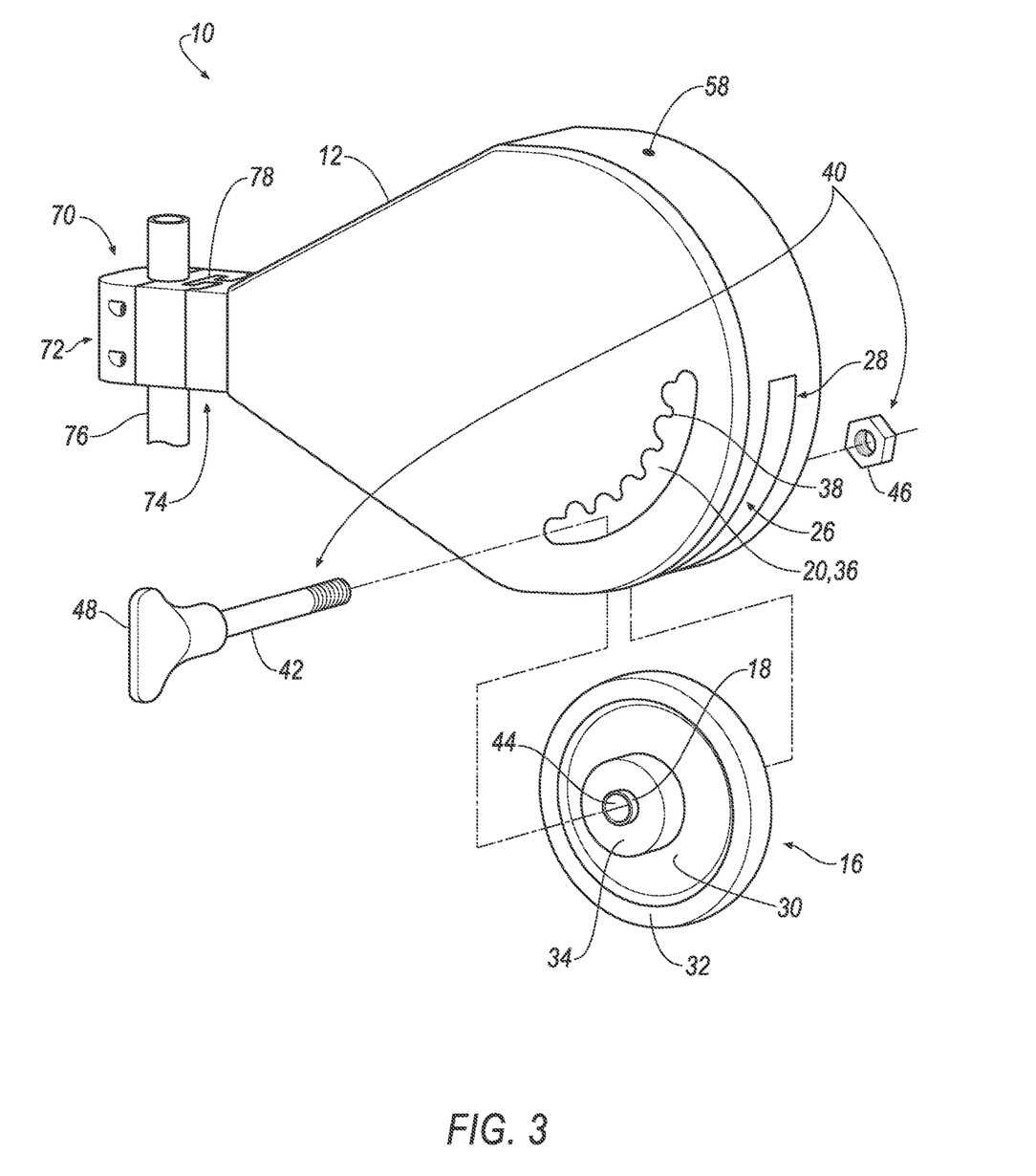
FIG. 3 is a partially exploded view of the auxiliary power device.
Figure 4:
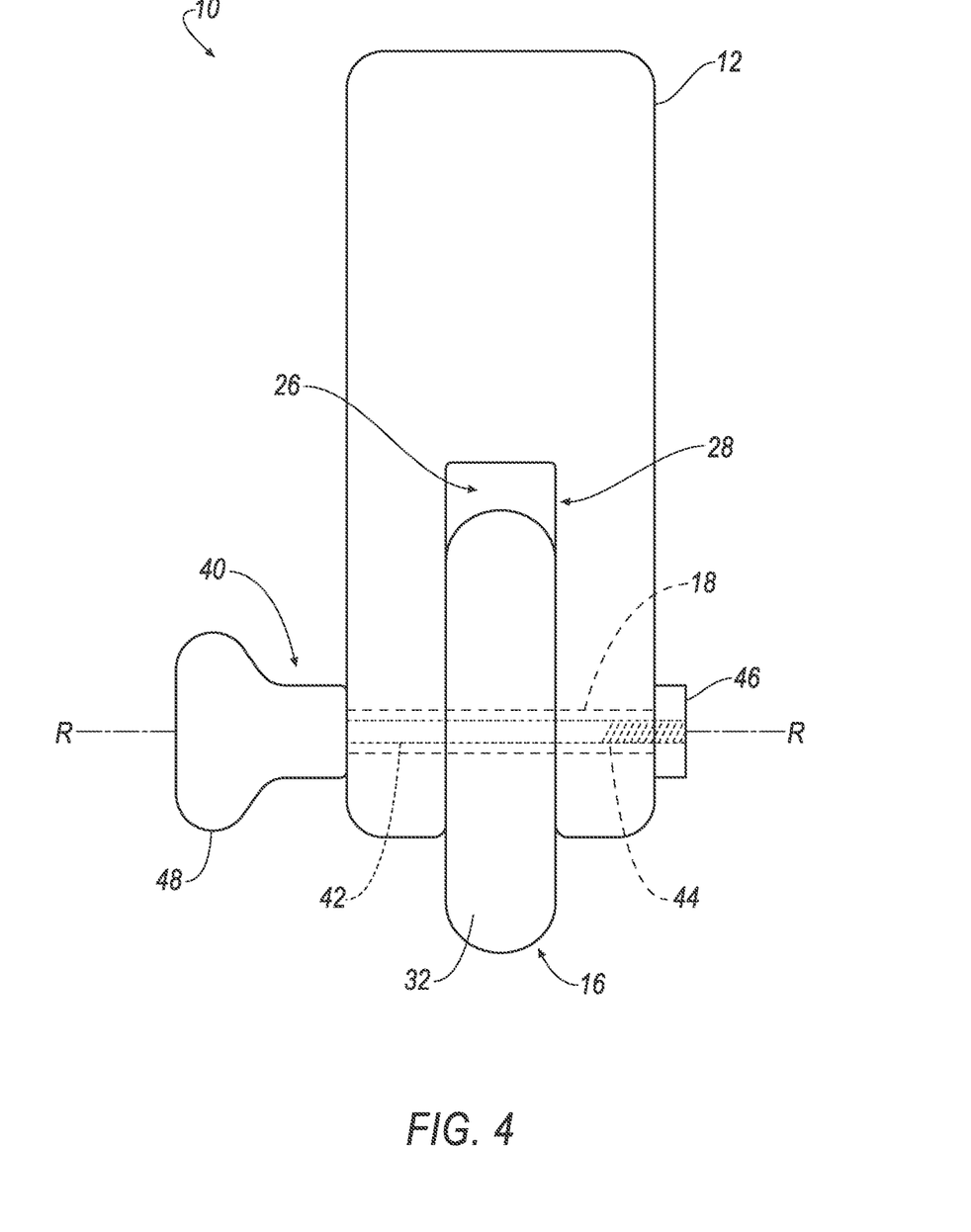
FIG. 4 is a rear view of the auxiliary power device with a spindle shown in hidden lines.

As shown in FIGS. 2-4, the wheel 16 has a rim 30 that is rotatably supported on the spindle 18. In other words, when the spindle 18 is fixed relative to the housing 12, the wheel 16 rotates about the spindle 18 relative to the housing 12. The rim 30 may be rotatably coupled to the spindle 18 in any suitable fashion, e.g., bearings (not shown) may be disposed between the rim 30 and the spindle 18.

The wheel 16 may include a tire 32 on the rim 30. The tire 32 may be formed of any suitable material. The tire 32 may be relatively rigid or may be inflatable.

With reference to FIGS. 2-3, the wheel 16 may include a pulley 34 coupled to the rim 30 and the spindle 18. The pulley 34 may be fixed to the rim 30 and may be rotatable with the rim 30 about the spindle 18. The pulley 34 may transfer rotation from the motor 14 to the rim 30 and tire 32, as set forth further below, to propel the auxiliary power device 10 and the vehicle.

With reference to FIGS. 2-4, the spindle 18 extends through each side of the rim 30 and through the track 20 in the housing 12. The track 20 adjustably supports the spindle 18 of the wheel 16. In other words, the spindle 18 can be adjusted relative to the track 20 to position the wheel 16 in the opening 28.

With reference to FIGS. 2-3, the track 20 may be a slot 36 extending through the housing 12. Specifically, the housing 12 may include two slots 36 disposed on opposite sides (not numbered) of the housing 12. The slots 36 and the opening 28 each extend in parallel paths and may each have the same length. The opening 28 may be disposed between the slots 36 equidistantly from slots 36. The slots 36 are each sized and shaped to receive the spindle 18.

With continued reference to FIGS. 2-3, the track 20 may include a plurality of notches 38 spaced along the track 20, e.g., the notches 38 are spaced along each slot 36. Each notch 38 is sized and shaped to receive the spindle 18. The spindle 18 is moveably engaged with the notches 38 and may be moved along the slots 36 and inserted between to choose the desired position of the wheel 16 along the slots 36. In the alternative to the slots 36, the track 20 may be any suitable type of track 20 that allows the position of the spindle 18 and wheel 16 to be adjusted relative to the housing 12.

With reference to FIGS. 2-4, the auxiliary power device 10 includes a lock 40 configured to lock the spindle 18 to the housing 12 at a desired location along the track 20, e.g., in a desired one of the notches 38. The lock 40 is moveable between an engaged position in which the spindle 18 is fixed to the housing 12 along the track 20 and a disengaged position in which the spindle 18 is release along the track 20. When the spindle 18 is in the disengaged position, the spindle 18 is free to move along the track 20. The lock 40 may include a surface frictionally engaged with the housing 12 in the engaged position. Alternatively, the lock 40 may be fixed to the housing 12 in the engaged position in any suitable manner.

With continued reference to FIGS. 2-4, the lock 40 may include a threaded fastener 42 received by the spindle 18. In particular, the threaded fastener 42 may extend through spindle 18, i.e., the spindle 18 may define a bore 44 and the threaded fastener 42 may extend from opposite sides (not numbered) of the bore 44.

The lock 40 may include a nut 46, shown in FIGS. 3-4, coupled to the housing 12 and threadedly engaging the threaded fastener 42. With continued reference to FIGS. 3-4, the threaded fastener 42 may include a head 48 presenting the surface that frictional engages the housing 12 in the engaged position. The housing 12 is sandwiched between the head 48 and the nut 46. The threaded fastener 42 may be tightened relative to the nut 46 to pinch the housing 12 against the spindle 18 to fix the spindle 18 relative to the housing 12, and the threaded fastener 42 may be loosened relative to the nut 46 to release the spindle 18 relative to the housing 12. The nut 46 may be disposed on an exterior (not numbered) of the housing 12 on either wall of the housing 12, or alternatively may be disposed in the cavity 26 of the housing 12 on either wall of the housing 12. The head 48 may be handle-shaped, e.g., a wing nut 46 configuration, to assist in rotating the threaded fastener 42.

As set forth above, the motor 14 is supported by the housing 12. For example, the motor 14 may be directly connected to the housing 12 or may be connected to the housing 12 through an intermediate component (not shown). As also set forth above, the motor 14 may be disposed in the cavity 26. Alternatively, the motor 14 may be supported by the housing 12 in any suitable location of the housing 12.

The motor 14 includes a rotational shaft 50 engaged with the wheel 16. The rotational shaft 50 is configured to transmit rotation from the motor 14 to the wheel 16. The rotational shaft 50 may be engaged with the wheel 16 in any suitable fashion. For example, as shown in FIG. 2, a pulley 52 may be fixed to the rotational shaft 50. The pulley 52 on the rotational shaft 50 may be engaged with the pulley 34 of the wheel 16 to transmit rotation from the motor 14 to the wheel 16. For example, a belt 54 (as shown in FIG. 2), a chain, etc., may engage the pulley 34 on the rotational shaft 50 with the pulley 34 of the wheel 16.

The slots 36 may be concentric around the rotational shaft 50. Accordingly, as the wheel 16 is adjusted along the slots 36, tension on the belt 54 between the pulleys 34, 52 remains constant regardless of the adjusted position. The opening 28 may be concentric around the rotational shaft 50 such that the amount of wheel 16 exposed through the opening 28 remains constant regardless of the adjusted position.

Figure 8:
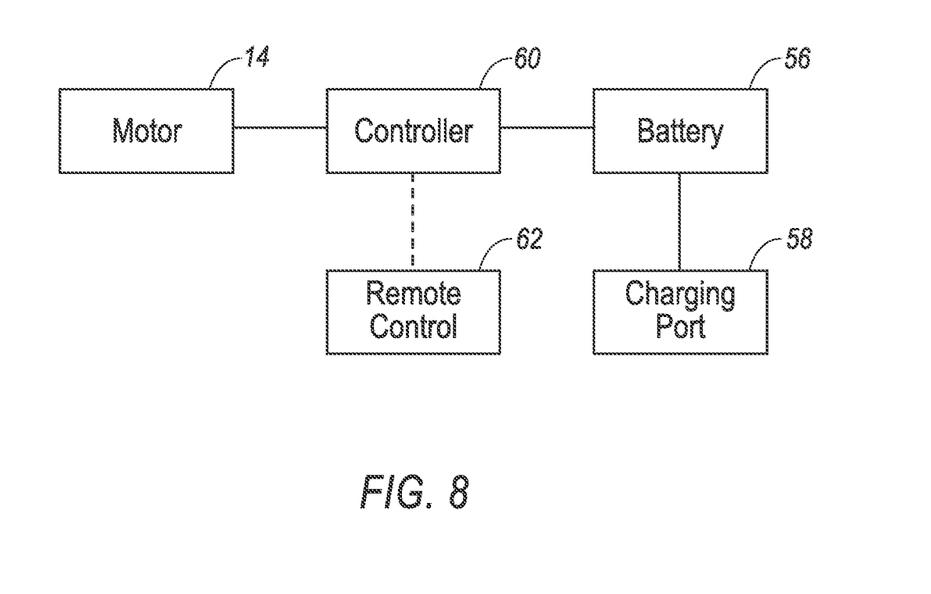
FIG. 8 is a schematic of electronic components of the auxiliary power device auxiliary power device.

The motor 14 may be electrically powered. Alternatively, the motor 14 may be of any suitable type. With reference to FIG. 8, the auxiliary power device 10 has a battery 56. The battery 56 is electrically connected 94 to the motor 14 to power the motor 14. The battery 56 may be supported by the housing 12. For example, the motor 14 may be directly connected to the housing 12 or may be connected to the housing 12 through an intermediate component (not shown). Specifically, the battery 56 may be disposed in the cavity 26.

The battery 56 may be rechargeable. The housing 12 may include a charging port 58 in electrical communication with the battery 56 to recharge the battery 56. The recharging port 58 may be located on a top part (not numbered) of the housing 12 for ease of access.

The auxiliary motor 14 may include a controller 60 coupled the motor 14. The controller 60 may be electrically connected 94 to one or both of the motor 14 and the battery 56. The controller 60 controls the performance of the motor 14, i.e. speed and direction.

Figure 7:
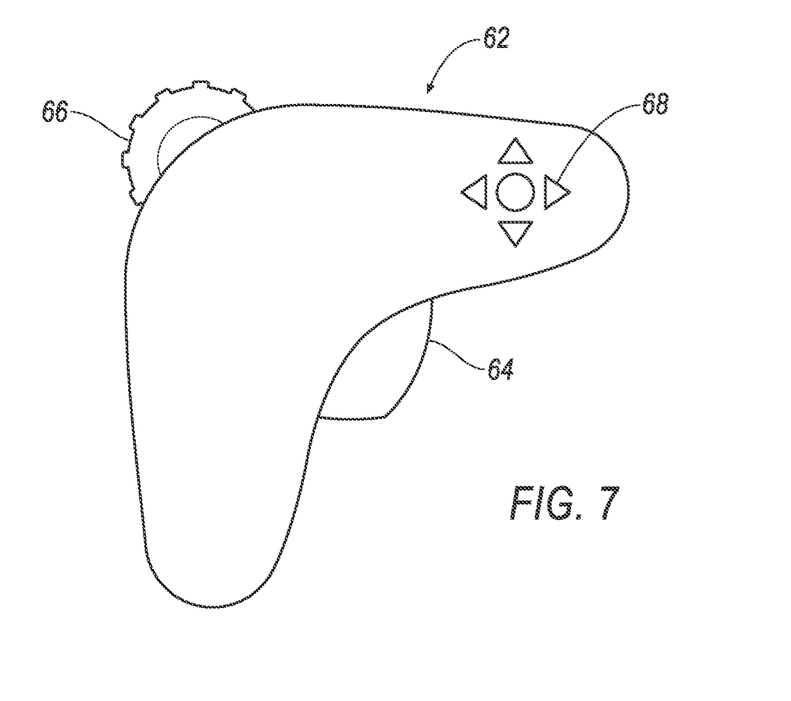
FIG. 7 is a perspective view of a remote control.

With reference to FIGS. 7 and 8, the auxiliary power device 10 may include a remote control 62 in wireless communication with the controller 60 to communicate user input to the controller 60 to change the performance of the motor 14. The remote control 62 is accessible and portable at the fingertips of the user. The remote control 62 can be used while the auxiliary power device 10 is driving a vehicle in addition to, or the alternative to, changing user input directly to the auxiliary power device 10. The remote control 62 may be in communication with the controller 60 in any suitable fashion, e.g., Bluetooth. Infrared (IR), radiofrequency (RF), etc.

With reference to FIG. 7, the remote control 62 may include a trigger 64 for turning power on/off to the motor 14. A wheel 66 on the remote control 62 may control the amount of power supplied to the motor 14. The remote control 62 may include directional controls 68. In the event that multiple auxiliary power devices 10 are connected to the frame 76 of the vehicle, the directional controls 68 may selectively control the amount of power supplied to the motor 14 of each auxiliary power device 10 to steer the vehicle. For example, the auxiliary power devices 10 may be spaced from each other in a cross-vehicle direction, e.g., spaced from each other in a direction perpendicular to the direction of movement of the vehicle, and the motor 14 of one of the auxiliary power devices 10 may be powered more than the motor 14 of another one of the auxiliary power devices 10 to spin the vehicle about the lesser powered auxiliary power device 10.

Figure 5:
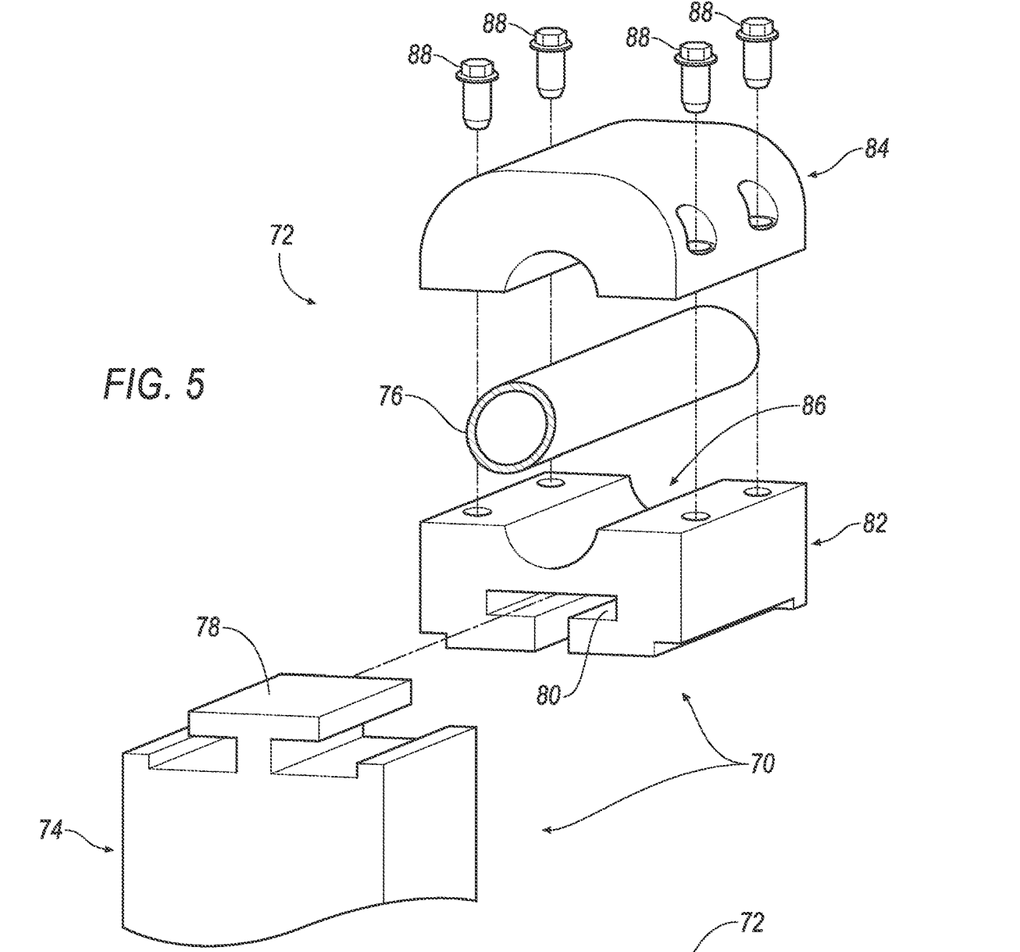
FIG. 5 is an exploded view of a portion of the housing and a releasable mounting device disengaged with a vehicle frame.
Figure 6:
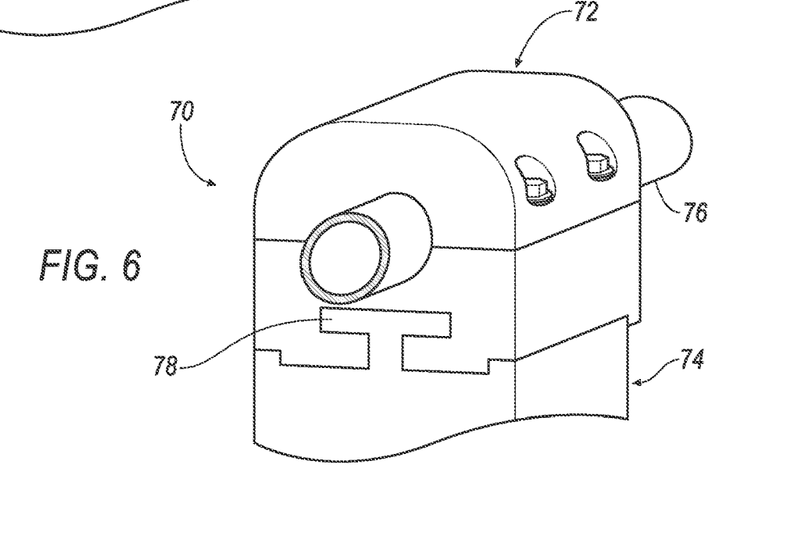
FIG. 6 is a perspective view of the releasable mounting device of FIG. 5 engaged with the vehicle frame.

With reference to FIGS. 5 and 6, the housing 12 may support a releasable mounting device 70 to mount the housing 12 to the frame 76 of the vehicle. The releasable mounting device 70 may include a frame mount 72 and a housing mount 74. One of the frame mount 72 and the housing mount 74 includes a tongue 78 and the other of the frame mount 72 and the housing mount 74 includes a groove 80 removeably receiving the tongue 78. The tongue 78 can be removeably engaged with the groove 80 to mount the housing 12 to the frame 76 of the vehicle.

The tongue 78 and the groove 80 may have corresponding shapes so that the tongue 78 may be nested in the groove 80. The tongue 78 and the groove 80 may be releasably fixed to each other in any suitable fashion, e.g., by a set screw, etc.

The frame mount 72 may be permanently fixed to the frame 76 of the vehicle. For example, the frame mount 72 may include a first segment 82 and a second segment 84 defining a cavity 86 there between. The cavity 86 receives the frame 76. The first segment 82 and the second segment 84 may be fixed to each other, e.g., by fasteners 88, to fix the frame mount 72 to the frame 76.

The housing mount 74 may be permanently fixed the housing 12. For example, the housing mount 74 may be integral with the housing 12, i.e., formed simultaneously with the housing 12 as a single continuous unit. Alternatively, the housing mount 74 may be formed separately from the housing 12 and subsequently attached to the housing 12.

As set forth above, the auxiliary power device 10 may be removeably attached to a plurality of different vehicles. One of the frame mounts 72 may be mounted, permanently or temporarily, to each of the vehicles on which the auxiliary power device 10 is intended to be attached. The housing 12 may be mounted to the frame 76 of one of the vehicles with the use of the releasable mounting device 70, e.g., by engaging the housing mount 74 to the frame mount 72. Before or after the housing 12 is mounted to the frame 76 with the releasable mounting device 70, the wheel 16 is adjusted along the track 20 relative to the housing 12 to a desired location best suited for the chosen vehicle. For example, the threaded fastener 42 may be loosened relative to the nut 46 to loosen the spindle 18 in the slots 36. The spindle 18 is then moved along the slot 36 to position the wheel 16 in the desired position along the slot 36. With the wheel 16 in the desired position along the slot 36, the spindle 18 is engaged with the nearest notch 38 and the threaded fastener 42 is then tightened relative to the nut 46 to pinch the spindle 18 between the housing 12 to fix the spindle 18 along the slot 36. When it is desired to use the auxiliary power device 10 on another vehicle, the auxiliary power device 10 may be released from the frame 76 by disengaging the tongue 78 from the groove 80. The auxiliary power device 10 may then be removeably attached to another vehicle by engaging the housing mount 74 with the frame mount 72 of that vehicle. The wheel 16 may then be adjusted along the track 20 relative to the housing 12 to a desired location best suited for the chosen vehicle by repeating the steps above.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed:

1. An auxiliary power device comprising:
   a housing;
   a motor supported by the housing;
   a wheel engaged with the motor, the wheel having a rotational axis and a spindle on the rotational axis;
   the housing defining a track adjustably supporting the spindle of the wheel; and
   a lock coupled to the spindle, the lock being moveable between an engaged position fixing the spindle to the housing along the track and a disengaged position releasing the spindle along the track;
   the lock including a threaded fastener received by the spindle.

2. An auxiliary power device as set forth in claim 1 wherein the lock includes a nut threadedly engaging the threaded fastener, and wherein the lock includes a surface frictionally engaged with the housing in the engaged position.

3. An auxiliary power device as set forth in claim 1 wherein the track is a slot extending through the housing.

4. An auxiliary power device as set forth in claim 3 further comprising a plurality of notches spaced along the slot.

5. An auxiliary power device as set forth in claim 4 wherein the spindle is moveably engaged with the notches.

6. An auxiliary power device as set forth in claim 3 further comprising a lock coupled to the spindle, the lock being moveable between an engaged position fixing the spindle to the housing along the slot and a disengaged position releasing the spindle along the slot.

7. An auxiliary power device as set forth in claim 6 wherein the lock includes a nut threadedly engaging the threaded fastener, and wherein the lock includes a surface frictionally engaged with the housing in the engaged position.

8. An auxiliary power device as set forth in claim 7 wherein the threaded fastener includes a head, the housing being sandwiched between the head and the nut.

9. An auxiliary power device as set forth in claim 1 wherein the motor includes a rotational shaft engaged with the wheel, the slot being concentric around the rotational shaft.

10. An auxiliary power device as set forth in claim 1 wherein the housing defines a cavity and an opening in communication with the cavity, the wheel being partially disposed in the cavity and extending through the opening.

11. An auxiliary power device as set forth in claim 1 wherein the motor is electrically powered.

12. An auxiliary power device as set forth in claim 1 further comprising a battery supported by the housing and electrically connected to the motor.

13. An auxiliary power device as set forth in claim 12 further comprising a recharging port on the housing and electrically connected to the battery.

14. An auxiliary power device as set forth in claim 1 further comprising a controller coupled with the motor.

15. An auxiliary power device as set forth in claim 14 further comprising a remote controller in wireless communication with the controller.

16. An auxiliary power device as set forth in claim 1 further comprising a releasable mounting device having a housing mount fixed to the housing and a frame mount removably attached to the housing mount.

17. An auxiliary power device as set forth in claim 16 wherein one of the frame mount and the housing mount includes a tongue and the other of the frame mount and the housing mount includes a groove removeably receiving the tongue.

18. An auxiliary power device as set forth in claim 1 wherein the wheel includes a rim engageable with the spindle and a tire on the rim.

19. An auxiliary power device comprising: a housing; a motor supported by the housing; a wheel engaged with the motor, the wheel having a rotational axis and a spindle on the rotational axis; the housing defining a track adjustably supporting the spindle of the wheel; the track being a slot extending through the housing; and a lock coupled to the spindle, the lock being moveable between an engaged position fixing the spindle to the housing along the slot and a disengaged position releasing the spindle along the slot; the lock including a nut threadedly engaging the threaded fastener; and the lock including a surface frictionally engaged with the housing in the engaged position.

20. An auxiliary power device comprising: a housing; a motor supported by the housing; a wheel engaged with the motor, the wheel having a rotational axis and a spindle on the rotational axis; the housing defining a track adjustably supporting the spindle of the wheel; and a releasable mounting device having a housing mount fixed to the housing and a frame mount removably attached to the housing mount; one of the frame mount and the housing mount including a tongue and the other of the frame mount and the housing mount including a groove removeably receiving the tongue.

* * * * *